(12) United States Patent
Lemaire et al.

(10) Patent No.: US 9,796,256 B2
(45) Date of Patent: Oct. 24, 2017

(54) CONTROLLABLE HYDRAULIC VIBRATION-DAMPING SUPPORTS

(71) Applicant: HUTCHINSON, Paris (FR)

(72) Inventors: Gabriel Lemaire, Saint-Denis-les-Ponts (FR); Franck Coudiere, Cravant (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 14/957,253

(22) Filed: Dec. 2, 2015

(65) Prior Publication Data
US 2016/0185204 A1 Jun. 30, 2016

(30) Foreign Application Priority Data
Dec. 2, 2014 (FR) ...................... 14 61789

(51) Int. Cl.
| F16F 15/02 | (2006.01) |
| B60K 5/12 | (2006.01) |
| F16F 13/26 | (2006.01) |
| F16F 13/10 | (2006.01) |

(52) U.S. Cl.
CPC .......... B60K 5/1283 (2013.01); B60K 5/1208 (2013.01); F16F 13/10 (2013.01); F16F 13/26 (2013.01); F16F 13/264 (2013.01)

(58) Field of Classification Search
CPC .. F16F 13/10; F16F 13/20; F16F 13/26; F16F 13/262; F16F 13/264; F16F 13/268
USPC ................. 267/140.11–140.15, 141.1–141.7; 248/550, 562
See application file for complete search history.

(56) References Cited

U.S. PATENT DOCUMENTS

| 4,657,232 A | * | 4/1987 | West | F16F 13/26 267/140.13 |
| 4,664,219 A | * | 5/1987 | Hoerig | B60K 5/1283 180/291 |
| 4,693,455 A | * | 9/1987 | Andra | F16F 13/264 188/379 |
| 4,836,513 A | * | 6/1989 | Kramer | F16F 13/10 267/140.13 |
| 4,901,986 A | | 2/1990 | Smith | |
| 5,246,213 A | * | 9/1993 | Zup | F16F 13/26 267/140.14 |
| 6,010,120 A | * | 1/2000 | Nagasawa | F16F 13/20 267/140.12 |

(Continued)

FOREIGN PATENT DOCUMENTS

| EP | 0115417 A | 8/1984 |
| EP | 0 490 719 A1 | 6/1992 |

OTHER PUBLICATIONS

French Search Report Application No. FR 1461789 dated Jun. 15, 2015.

*Primary Examiner* — Christopher Schwartz
(74) *Attorney, Agent, or Firm* — Miller, Matthias & Hull LLP

(57) ABSTRACT

Controllable hydraulic vibration-damping support comprising a rigid block, a bell-shaped elastomer body becoming wider from the block to an annular strength member, a working chamber, a compensation chamber, a constricted passageway connecting the working chamber to the compensation chamber, and an auxiliary chamber separated from the working chamber by a decoupling valve controlled by a control device. The auxiliary chamber, the decoupling valve and the control device are in the block.

10 Claims, 6 Drawing Sheets

(56) References Cited

U.S. PATENT DOCUMENTS

| | | | | |
|---|---|---|---|---|
| 6,361,031 B1* | 3/2002 | Shores | ............... | F16F 13/26 |
| | | | | 267/140.14 |
| 6,523,816 B1* | 2/2003 | Gastineau | ............ | F16F 13/264 |
| | | | | 267/140.14 |
| 6,588,737 B2* | 7/2003 | Goto | ............... | F16F 13/264 |
| | | | | 267/140.14 |
| 9,068,625 B2* | 6/2015 | Yamamoto | ............ | F16F 13/262 |
| 2003/0024593 A1* | 2/2003 | Anzawa | ............ | F16F 13/268 |
| | | | | 140/14 |
| 2006/0006593 A1 | 1/2006 | Bretaudeau et al. | | |
| 2010/0102492 A1* | 4/2010 | Lee | ............ | F16F 13/26 |
| | | | | 267/121 |
| 2015/0233443 A1* | 8/2015 | Lemaire | ............ | F16F 13/268 |
| | | | | 267/140.14 |

* cited by examiner

CONTROLLABLE HYDRAULIC VIBRATION-DAMPING SUPPORTS

CROSS-REFERENCE TO RELATED APPLICATION

This application claims priority under the Paris Convention to French Patent Application No. 14 61789 filed on Dec. 2, 2014.

FIELD OF THE DISCLOSURE

The present invention relates to controllable hydraulic vibration-damping supports.

BACKGROUND OF THE DISCLOSURE

More particularly, the invention relates to a controllable hydraulic vibration-damping support intended to be interposed for purposes of damping between first and second rigid elements, this vibration-damping support comprising:
first and second strength members intended to be secured to the two rigid elements to be connected, the first strength member having the form of a block and the second strength member being of annular shape centred on a central axis, the first strength member being arranged substantially on said central axis,
an elastomer body which connects together the first and second strength members and which delimits at least partially a working chamber, the elastomer body having a bell shape, having a top firmly fixed to the first strength member and an annular base firmly fixed to the second strength member,
a deformable compensation chamber which communicates with the working chamber via a constricted passageway, the compensation chamber, the working chamber and the first constricted passageway forming a hydraulic volume filled with liquid, the first constricted passageway having a resonance frequency comprised between 5 and 20 Hz,
an auxiliary chamber,
a decoupling valve comprising an isolating diaphragm made of elastomer, which separates the working chamber and the auxiliary chamber, said decoupling valve being adapted for absorbing vibrations at certain frequencies greater than 20 Hz,
a control device comprising an actuator adapted for selectively locking the isolating diaphragm.

Document EP-A-0115417 describes a vibration-damping support of this type, in which the auxiliary chamber, the decoupling valve and the control device are arranged at the level of the hydraulic compensation chamber.

SUMMARY OF THE DISCLOSURE

A subject of the present invention is in particular to improve the vibration-damping supports of the above type, in particular in order to reduce their overall dimensions represented by the controllable decoupling function.

To this end, according to the invention, a vibration-damping support of the kind in question is characterized in that the auxiliary chamber and the decoupling valve are arranged in the first strength member, the control device being carried by said first strength member.

With these arrangements, the auxiliary chamber, the decoupling valve and the control device no longer interfere with the space assigned to the compensation chamber, which makes it possible either to make the vibration-damping support more compact (in particular in height), or to provide additional functions (for example an additional decoupling valve between the working chamber and the compensation chamber) without substantially increasing the overall dimensions of the vibration-damping support.

In various embodiments of the vibration-damping support according to the invention, one or more of the following arrangements may be used:
the control device is also contained in the first strength member;
the isolating diaphragm is formed in a single piece with the elastomer body;
the first strength member comprises a recess which receives the control device;
the recess of the first strength member extends along the central axis between first and second ends opening respectively into the working chamber and to the open air, the first end being closed by the isolating diaphragm;
the control device comprises a casing which is fitted into said recess and comprises a base delimiting the auxiliary chamber with the isolating diaphragm;
the auxiliary chamber is a pneumatic chamber and the control device is adapted for selectively either venting said auxiliary chamber to the open air, or evacuating said auxiliary chamber so as to lock said isolating diaphragm;
the control device comprises an air check valve normally only allowing air to escape from the auxiliary chamber to the atmosphere and not the reverse, and a venting device selectively operable to vent said auxiliary chamber to the open air;
the air check valve and the venting device are contained in a housing delimited by the casing of the control device, this housing being open opposite the base and covered by a cover secured on the first strength member.

Moreover, the invention also relates to a motor vehicle comprising an engine, a body and at least one vibration-damping support as defined above for connecting the engine to the body.

According to a first embodiment, the first strength member is connected to the engine, the second strength member is connected to the body, and the first strength member is arranged above the second strength member (this first embodiment in particular makes it possible for the elastomer body to filter out the switching clicks of the control device, so that these clicks are not transmitted to the vehicle body).

According to a second embodiment, the second strength member is connected to the engine, the first strength member is connected to the body, and the second strength member is arranged above the first strength member (this second embodiment in particular makes it possible for the elastomer body to filter out the noises of hydraulic operation of the constricted passageway, so that these noises are not transmitted to the vehicle body).

BRIEF DESCRIPTION OF THE DRAWINGS

Other features and advantages of the invention will become apparent from the following description of two of its embodiments, given as non-limitative examples, with reference to the attached drawings.

In the drawings.

DETAILED DESCRIPTION OF THE DISCLOSURE

In the various figures, the same references denote identical or similar elements.

Figure 1:
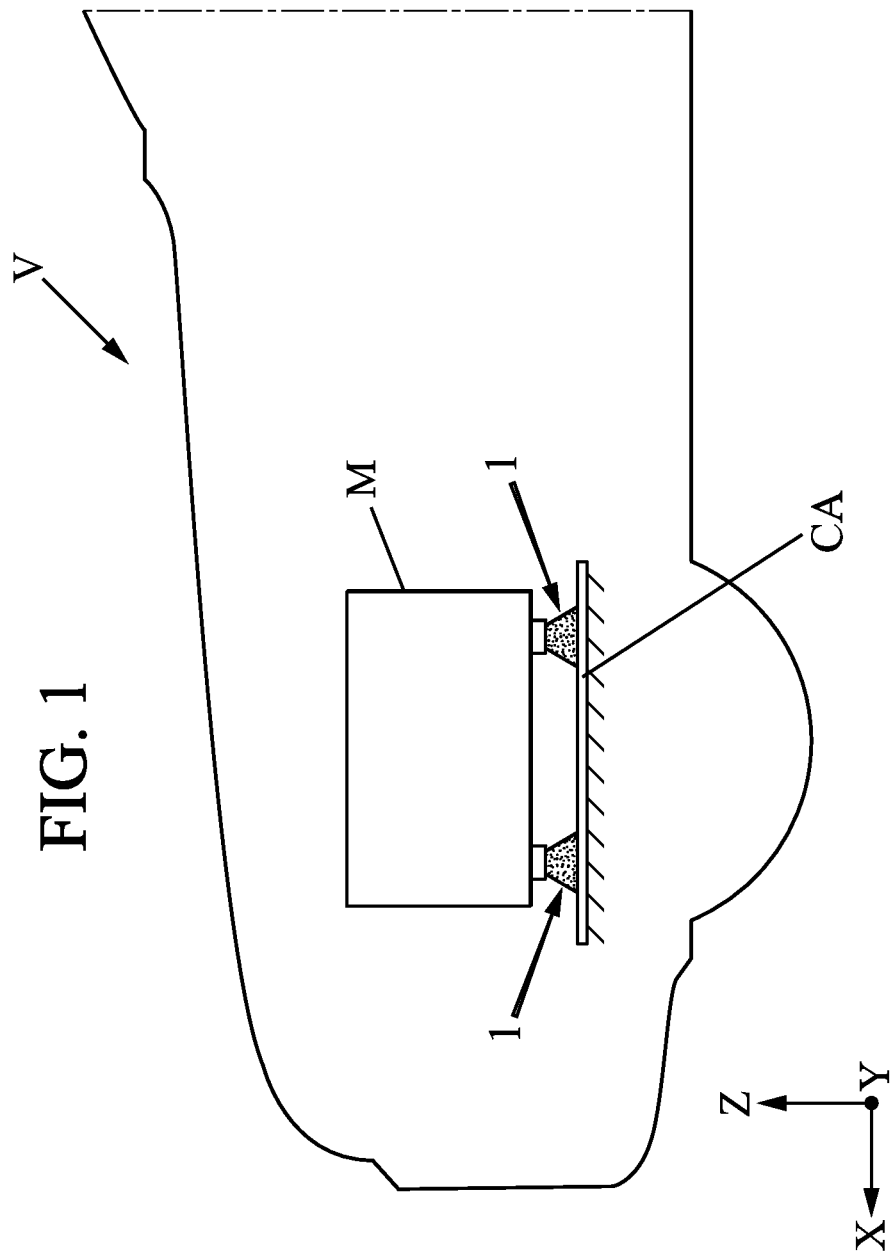
FIG. 1 is a diagrammatic view of a motor vehicle, the engine of which is connected to the body by at least one vibration-damping support according to a first embodiment of the invention.
Figure 2:
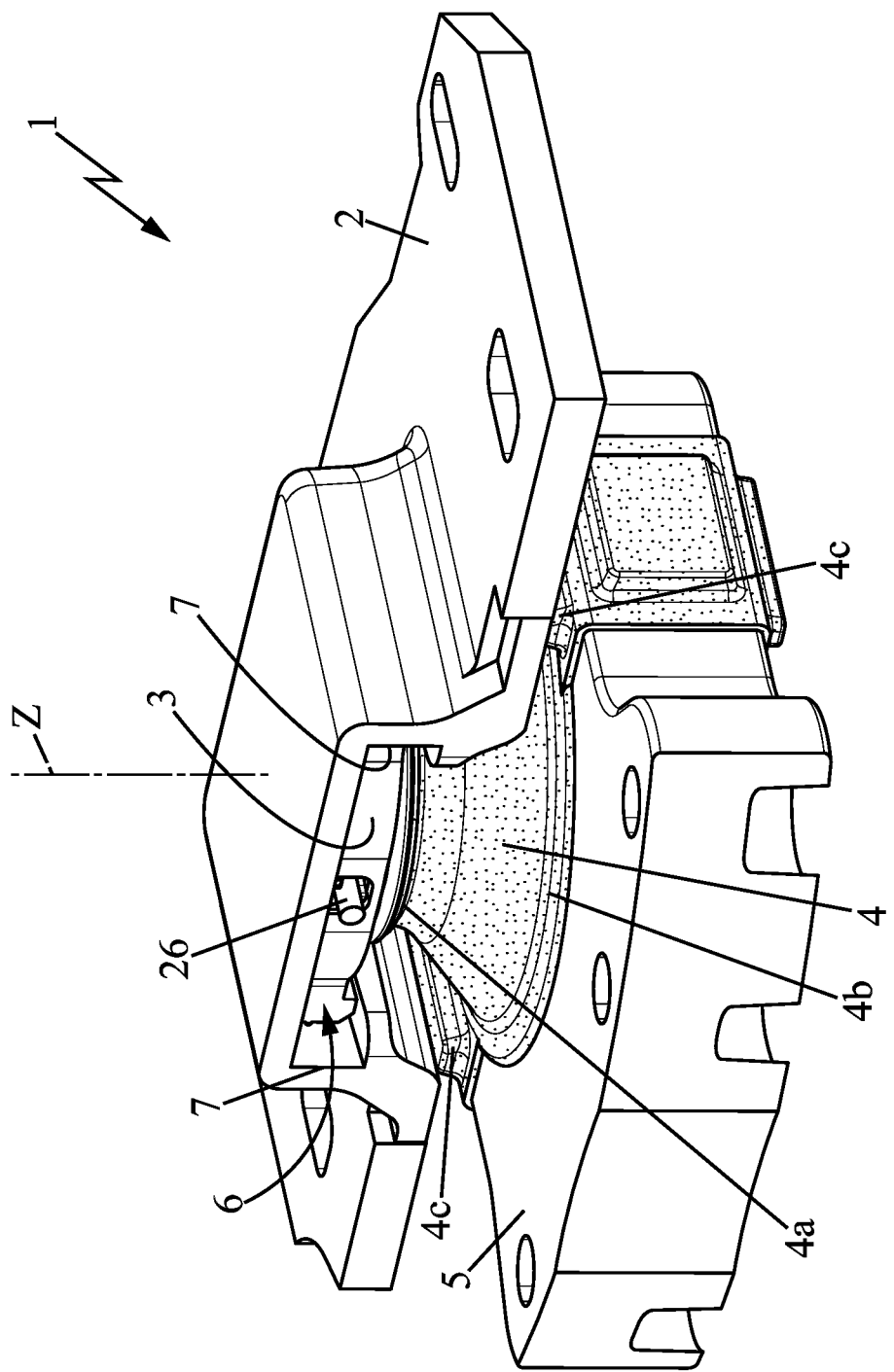
FIG. 2 is a perspective view of the vibration-damping support according to the first embodiment of the invention.

FIG. 1 represents a motor vehicle V, the engine E of which is connected to the body BO by at least one, in particular controllable, vibration-damping support 1, an embodiment of which is shown in FIG. 2.

The controllable hydraulic vibration-damping support 1 of FIG. 2 comprises:
- a first rigid strength member 3 for example in the form of a metal or plastic block, intended for example to be attached to the engine E of the vehicle directly or via a attachment member 2,
- an elastomer body 4 capable in particular of withstanding the static forces due to the weight of the vehicle engine E, this elastomer body possibly having for example a bell shape which extends axially along a central axis Z, for example vertical, between a top 4a bonded and overmoulded onto the first strength member 3 and an annular base 4b bonded and overmoulded onto the second strength member 5,
- a second rigid strength member 5, for example an annular strength member made of metal or plastic, which is intended to be attached for example to the body BO of the vehicle, directly via at least one attachment member (not shown). The second strength member is arranged under the first strength member 3 in the example considered.

In the example considered, the attachment member 2 may in particular be in the form of a plate, in particular substantially perpendicular to the central axis Z.

The attachment member 2 can optionally comprise a housing 6 which receives the outer portion of the first strength member 3 (i.e. the upper portion in the example of FIG. 2).

For example, the housing 6 can be formed by stamping of the attachment member 2, opening laterally to allow lateral fitting of the first strength member into the housing 6.

The housing 6 may in particular form a slide, formed for example by two lateral grooves 7, in which the corresponding lateral portions of the first strength member 3 are fitted.

Optionally, the attachment member 2 can cover a portion of the second strength member 5, which can extend substantially parallel to the attachment member 2. The second strength member can carry one or more stops 4c which interact with the attachment member 2 in order to limit the travel of the first strength member 3 towards the second strength member 5. The stop or stops 4c may be made of elastomer, for example moulded integrally with the elastomer body 4.

Figure 3:
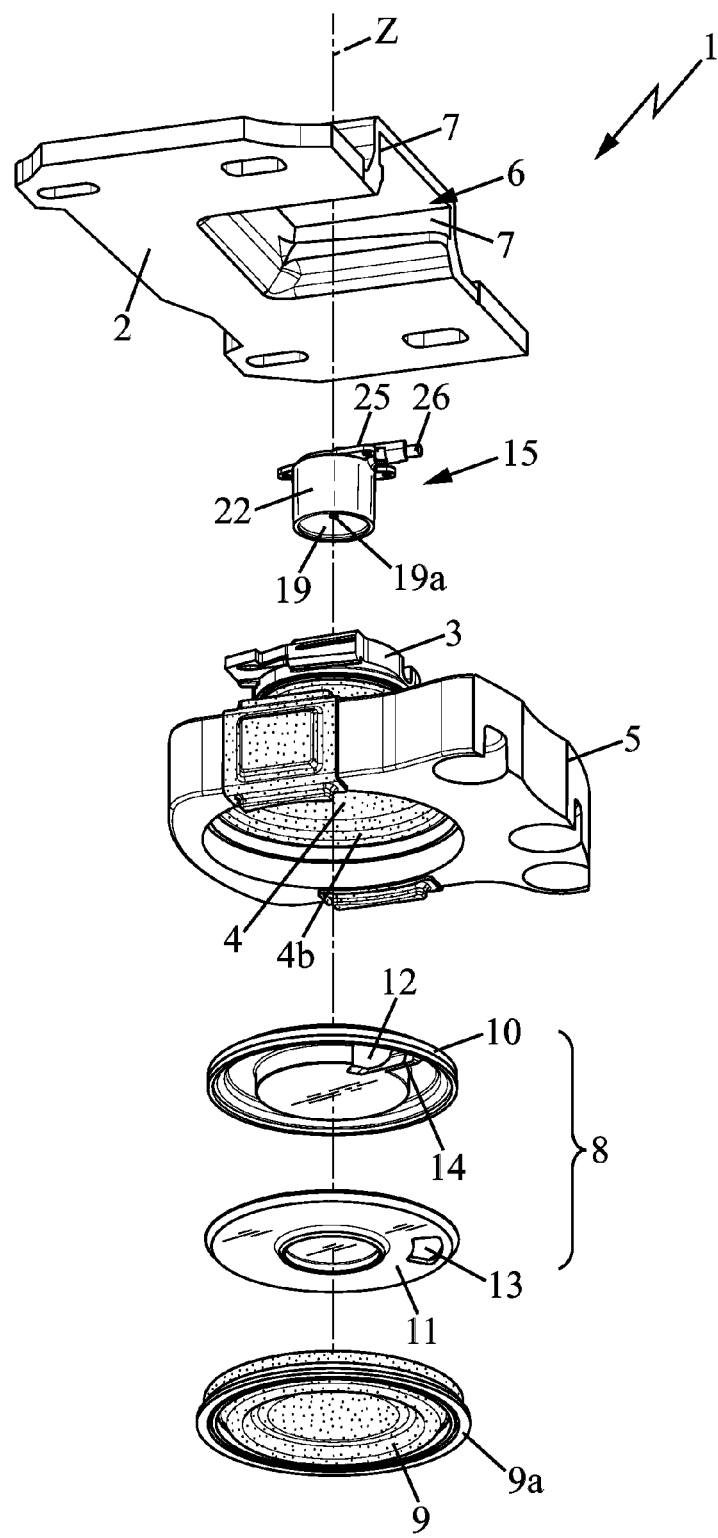
FIGS. 3 and 4 are perspective exploded views of the vibration-damping support of FIG. 2, seen in two different directions.
Figure 4:
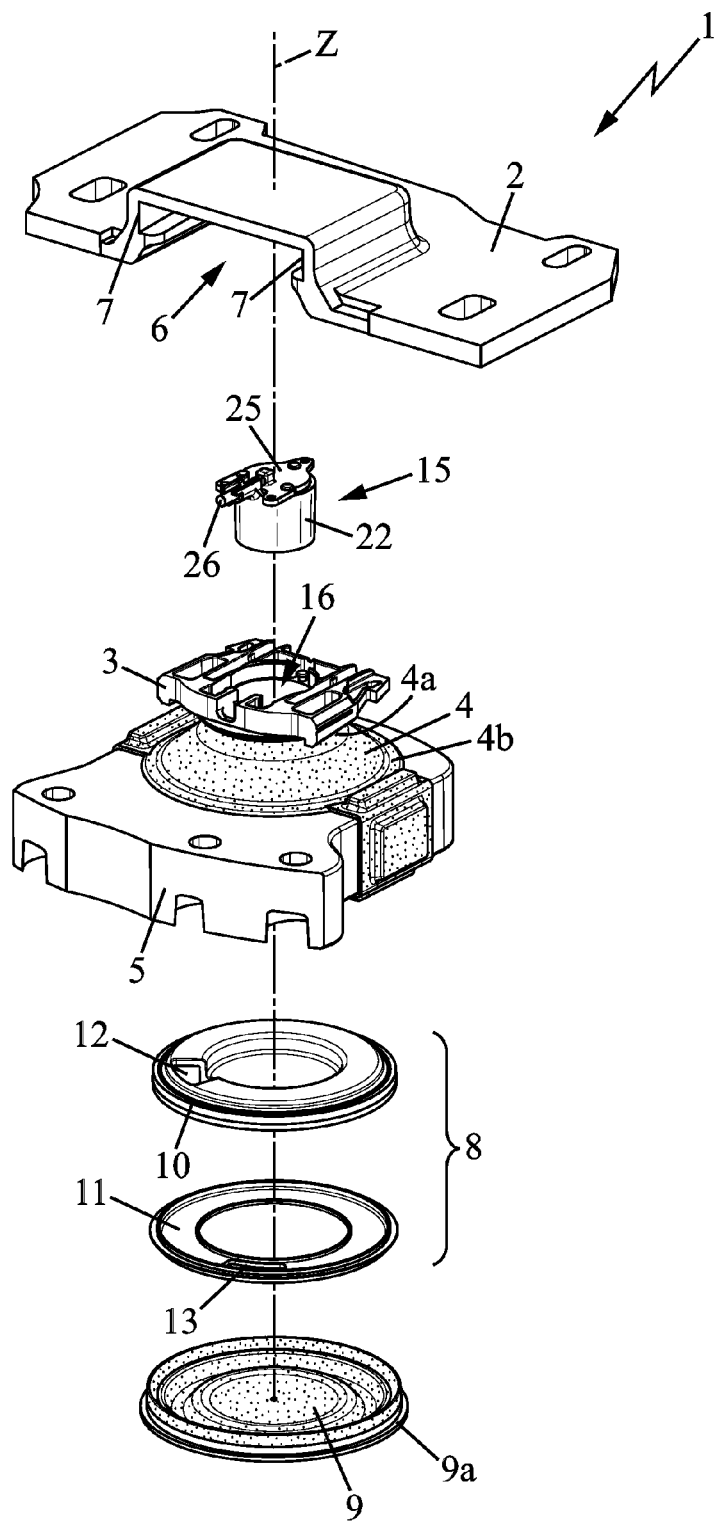
Figure 5:
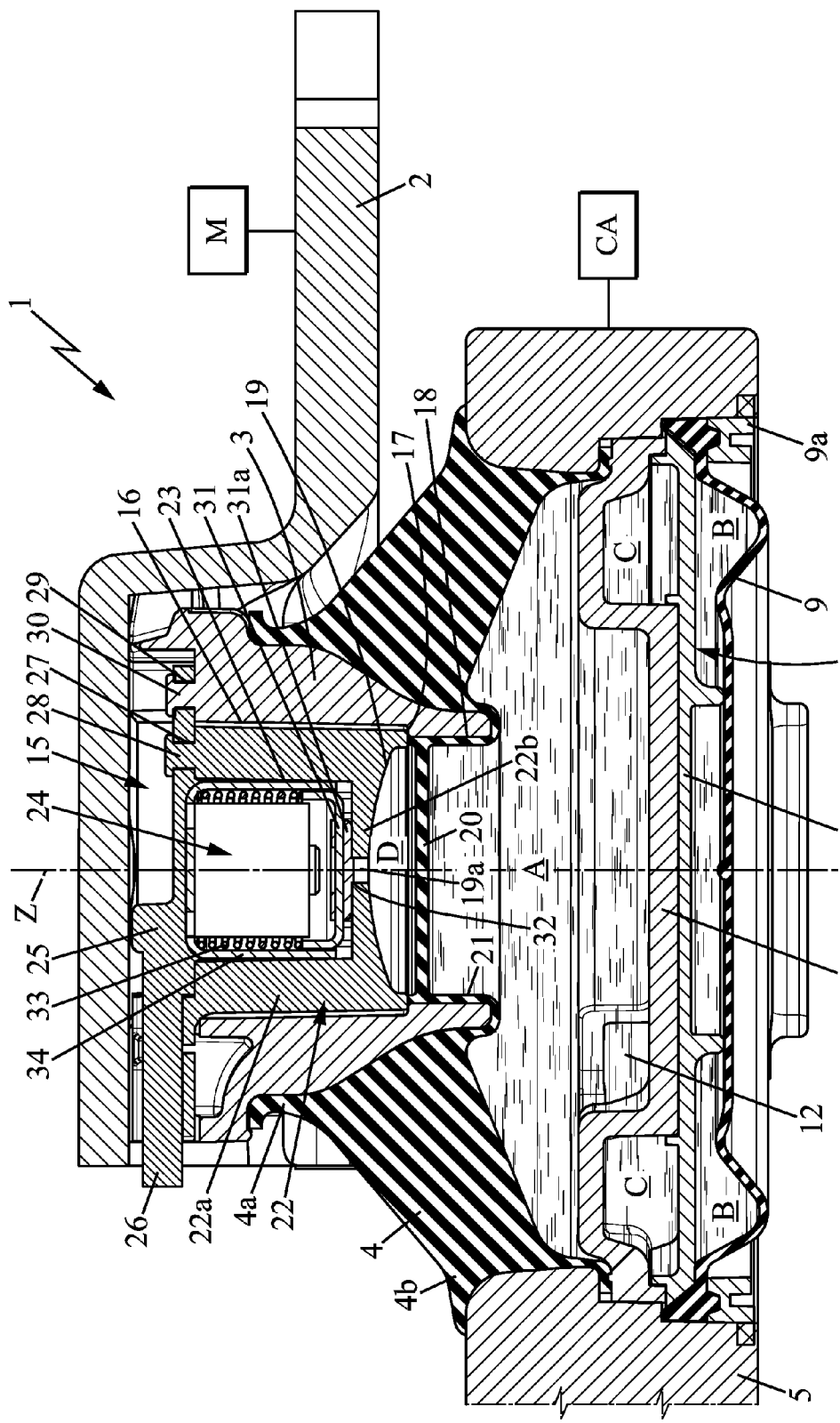
FIG. 5 is an axial sectional view of the vibration-damping support of FIG. 2.

As shown in FIGS. 3 to 5, the vibration-damping support 1 further comprises a rigid partition 8 firmly fixed to the second strength member 5 and applied hermetically against the base 4b of the elastomer body, delimiting therewith a hydraulic working chamber A. A flexible elastomeric membrane 9 forming a bellows is applied hermetically against the partition 8 opposite the working chamber A, delimiting, with said partition 8, a hydraulic compensation chamber B, which communicates with the working chamber A by a constricted passageway C. The working chamber, the compensation chamber B and the constricted passageway C together form a hydraulic volume filled with fluid, in particular glycol or some other fluid.

The constricted passageway C is sized to have a resonance frequency comprised between 5 and 20 Hz, typically between 8 and 12 Hz.

The rigid partition 8 can for example be constituted by the superimposition of two plates 10, 11 which delimit between them a channel in the shape of an arc of a circle forming the constricted passageway C. The constricted passageway C opens into the working chamber A via a cutout 12 made in the plate 10 and into the compensation chamber B via a cutout 13 made in the plate 11.

The plates 10, 11 comprise means so that the liquid which flows in the constricted passageway C follows the whole path of the aforementioned channel in the shape of an arc of a circle. In the example considered, these means can consist of a rib 14 of the plate 10, which is interposed angularly between the cutouts 12, 13.

The periphery of the flexible membrane 9 can be overmoulded and bonded onto a reinforcing ring 9a, which is for example welded or secured in some other way to the second strength member 5.

The vibration-damping support 1 further comprises an auxiliary chamber D, contained in the first strength member 3. The auxiliary chamber can be a pneumatic chamber.

The vibration-damping support 1 further comprises a decoupling valve arranged in the first strength member 3. The decoupling valve comprises an isolating diaphragm 20 made of elastomer, which separates the working chamber A and the auxiliary chamber D. Said decoupling valve is adapted for absorbing vibrations at certain frequencies greater than 20 Hz. Advantageously, the isolating diaphragm 20 is formed integrally with the elastomer body 4.

The vibration-damping support 1 also comprises a control device 15 carried by the first strength member 3, adapted for selectively locking the isolating diaphragm 20, so as to neutralize the action of the decoupling valve under certain operating conditions of the vehicle. The control device 15 is preferably also contained in the first strength member 3.

Advantageously, the first strength member 3 comprises a recess 16 which receives the control device 15. The recess 16 of the first strength member extends along the central axis Z between first and second ends opening respectively into the working chamber A (downwards in the example of FIGS. 2-5) and to the open air (upwards in the example of FIGS. 2-5), the first end being closed by the isolating diaphragm 20.

The housing recess 16 can be of a cylindrical general shape, for example a cylinder of revolution centred on the axis Z. The recess 16 can have a portion 18 of reduced section in the vicinity of the first end of said housing, which delimits a shoulder 17 oriented towards the second end of said housing.

The control device 15 can be adapted for selectively either venting the auxiliary chamber D to the open air, or bleeding air from said auxiliary chamber D so as to lock the isolating diaphragm 20.

The control device 15 can comprise a casing 22 which is fitted into the recess 16 from the second end of said recess. The casing 22 can rest on the aforementioned shoulder 17. The casing 22 can be made of plastic or some other material. It can comprise an annular side wall 22*a* and a base 22*b*, said base 22*b* delimiting the auxiliary chamber D with the isolating diaphragm 20. Advantageously, the base 22*b* can form a dome 19 facing the isolating diaphragm 20.

The base 22*b* of casing 22 can be perforated by at least one hole 19*a*, made for example at the centre of the dome 19. This hole 19*a* allows the auxiliary chamber D to communicate with a housing 23 delimited by the side wall 22*a* and the base 22*b*. The housing 23 can be open towards the second end of housing 16, i.e. opposite the auxiliary chamber D.

The control device 15 can comprise an air check valve 31-33 normally only allowing air to leave the auxiliary chamber D to the atmosphere and not the reverse, and a venting device 24 operable to selectively vent said auxiliary chamber D to the open air.

The air check valve 31-33 can comprise for example a valve member 31 which is arranged in the housing 23 of casing 22 and which is resiliently biased by a spring 33 so that it is pressed against a valve seat 32. In the example considered here, the valve seat 32 is formed on the face of the base 22*b* arranged opposite the auxiliary chamber D.

The valve member 31 can be made at least in at least one part of ferromagnetic material and can comprise a gasket 31*a* made of elastomer or other material, suitable to form a hermetic seal when applied against the valve seat 32.

The venting device 24 can in particular be an electromagnet, connected for example by an electrical connector 26 to external control means that are part of the vehicle, such as the onboard computer (not shown). The electromagnet 24 can be arranged in the housing 23 of casing 22. When ordered to do so by the onboard computer, the electromagnet 24 produces a magnetic field that pulls the valve member 31 away from the valve seat 32, placing the auxiliary chamber D in communication with the atmosphere. It should be noted that the electromagnet 24 could be replaced by any other actuator, in particular electrical or pneumatic, adapted for selectively locking and unlocking the isolating diaphragm 20.

The electromagnet 24 can for example be firmly fixed to a cage 34 made of metal or some other material, which is fitted into the housing 23 of the casing 22 and can serve as a guide for the valve member 31.

The housing 23 of the casing 22 can be covered, opposite the base 22*b*, by a cover 25. The cover 25 can be made of plastic or some other material; it can optionally comprise the aforementioned electrical connector 26.

The cover 25 can be secured on the first strength member 3 and/or on the casing 22. In the example considered, the cover 25 is secured both on the first strength member 3 and on the casing 22, for example by one or more rivets 28 belonging to the casing 22 and each passing through a corresponding hole 27 in the cover, and by one or more rivets 30 belonging to the first strength member 3 and each passing through a corresponding hole 29 in the cover.

The device which has just been described operates as follows.

When the engine E of the vehicle is operating under certain predefined conditions, for example at idle, the vehicle's onboard computer activates the electromagnet 24 in order to open the air check valve 31, 32, so that the auxiliary chamber D communicates with the atmosphere, which allows the isolating diaphragm 20 to move freely: in this operating mode, the vibrations of the engine E are transmitted to the working chamber A by the elastomer body 4, causing fluctuations of the volume of said working chamber. These fluctuations, with a frequency greater than 20 Hz and of relatively low amplitude, are absorbed by the isolating diaphragm 20.

Under other predetermined conditions, for example when the vehicle is moving (i.e. in particular when the engine speed is greater than a certain predetermined limit), the vehicle's onboard computer stops activating the electromagnet 24, so that the air check valve 31-33 returns to the closed position under the action of the spring 33. In this operating mode, the vibratory movements of the engine E, of relatively large amplitude and with a frequency generally comprised between 5 and 20 Hz, in particular between 8 and 12 Hz (so-called "shaking" movements), result in variations in the volume of the working chamber A that are of relatively large amplitude, causing deformations of the compensation chamber B, such that the constricted passageway C is then the seat of resonance phenomena allowing the damping of vibrations under good conditions.

In addition, in the early stages of this operating mode, the auxiliary chamber D still contains air, so that the isolating diaphragm 20 can move, but these movements expel air from the auxiliary chamber D through the air check valve 31-33. When almost all of the air contained in the auxiliary chamber D has been expelled, the isolating diaphragm 20 remains substantially pressed against the base 22*b* of the casing 22, and the decoupling valve is therefore deactivated in this operating mode.

Figure 6:
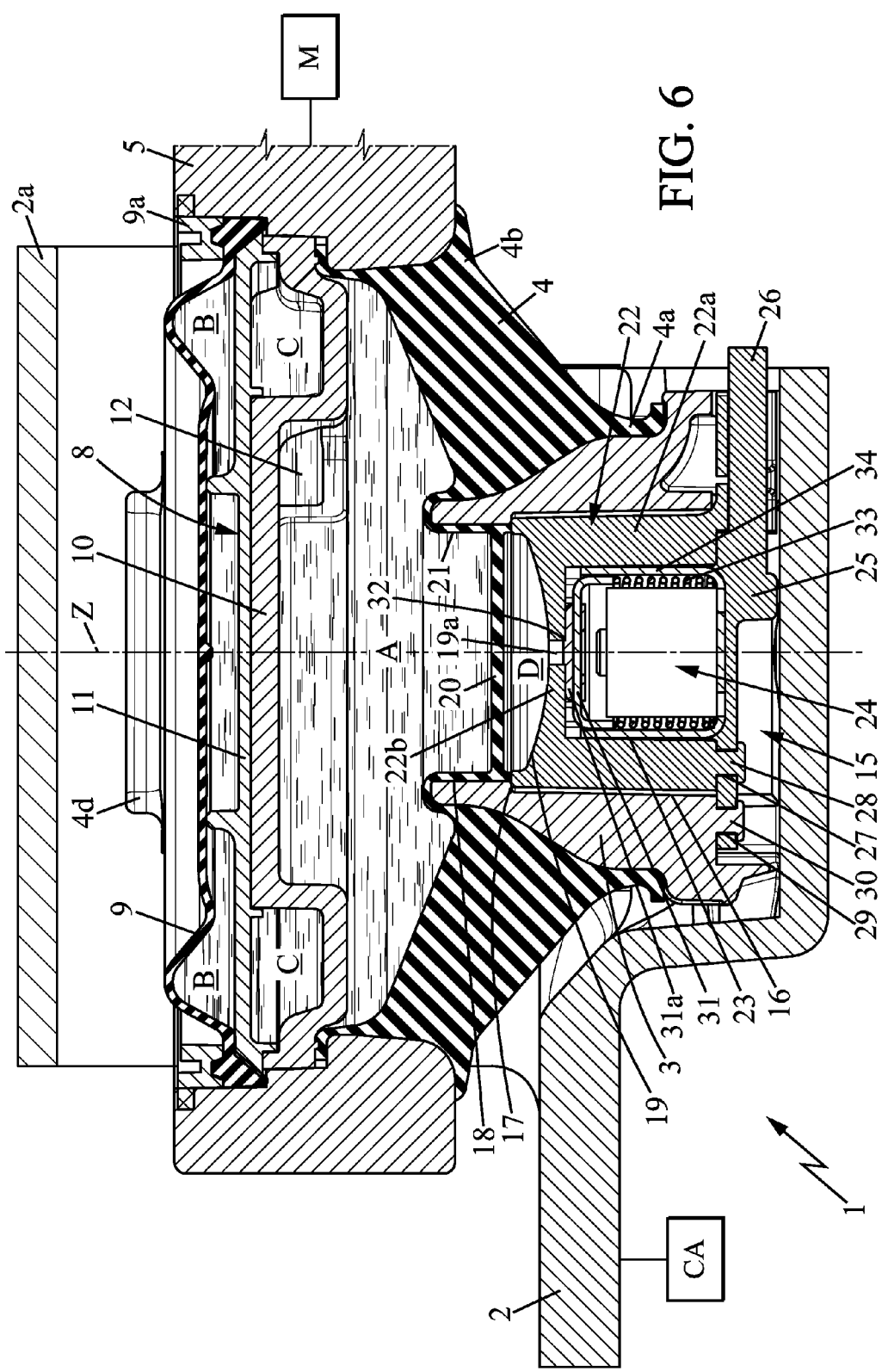
FIG. 6 is a sectional view similar to FIG. 5, in a second embodiment of the invention.

The second embodiment of the invention, shown in FIG. 6, is similar to the first embodiment both in its structure and in its operation, so that this second embodiment will not be described in detail.

This second embodiment differs from the first embodiment in that the second strength member 5 is connected to the engine E of the vehicle, the first strength member 3 is connected to the body BO of the vehicle, and the second strength member 5 is arranged above the first strength member 3. In this second embodiment, the plate 2 can be firmly fixed to a limiting yoke 2*a* which covers the second strength member 5 upwardly and limits the travel of said second strength member 5 relative to the first strength member 3. The second strength member 5 can optionally comprise one or more elastomer bosses 4*d*, optionally moulded in a single piece with the elastomer body 4, which interact by abutment with the lower face of the limiting calliper 2*a*.

The invention claimed is:

1. A controllable hydraulic vibration-damping support intended to be interposed for purposes of damping between first and second rigid elements, this vibration-damping support comprising:

first and second strength members intended to be secured to the two rigid elements to be connected, the first strength member having the form of a block and the second strength member being of annular shape centred on a central axis, the first strength member being arranged substantially on said central axis, an elastomer body which links together the first and second strength members and which delimits at least partially a working chamber, the elastomer body having a bell shape, with a top firmly fixed to the first strength member and an annular base firmly fixed to the second strength member, a deformable compensation chamber which communicates with the working chamber via a constricted passageway, the compensation chamber, the working chamber and the first constricted passageway forming a hydraulic volume filled with liquid, the first constricted passageway having a resonance frequency comprised between 5 and 20 Hz, a pneumatic auxiliary chamber, a decoupling valve comprising an isolating diaphragm made of elastomer, which separates the working chamber and the auxiliary chamber, said decoupling valve being adapted for absorbing vibrations at certain frequencies greater than 20 Hz, a control device comprising an actuator adapted for selectively either venting said auxiliary chamber, or emptying said auxiliary chamber so as to block said isolating diaphragm, wherein the control device comprises an air check normally only allowing air to escape from the auxiliary chamber to the atmosphere and not the reverse, and a venting device selectively operable for venting said auxiliary chamber to the open air, and wherein the auxiliary chamber and the decoupling valve are arranged in the first strength member, the control device being carried by said first strength member.

2. The vibration-damping support according to claim 1, in which the first strength member comprises a recess which receives the control device.

3. The vibration-damping support according to claim 2, in which the recess of the first strength member extends along the central axis between first and second ends opening respectively into the working chamber and to the open air, the first end being closed by the isolating diaphragm.

4. The vibration-damping support according to claim 3, in which the control device comprises a casing which is fitted into said recess and comprises a base delimiting the auxiliary chamber with the isolating diaphragm.

5. The vibration-damping support according to claim 4, in which the air check valve and the venting device are contained in a housing delimited by the casing of the control device, this housing being open opposite the base and covered by a cover secured on the first strength member.

6. A motor vehicle comprising an engine, a body and at least one of the vibration-damping supports according to claim 1 for attaching the engine to the body.

7. The vehicle according to claim 6, in which the first strength member is connected to the engine, the second strength member is connected to the body, and the first strength member being arranged above the second strength member.

8. The vehicle according to claim 6, in which the second strength member is connected to the engine, the first strength member is connected to the body, and the second strength member is arranged above the first strength member.

9. The vibration-damping support according to claim 1, in which the control device is also contained in the first strength member.

10. The vibration-damping support according to claim 1, in which the isolating diaphragm is formed in a single piece with the elastomer body.

* * * * *